July 19, 1966 W. E. JACOBSON 3,261,204
FORCE MEASURING APPARATUS
Filed Dec. 24, 1963 4 Sheets-Sheet 1

INVENTOR.
WALTER E. JACOBSON
BY *Lester W. Clark*
ATTORNEY

July 19, 1966   W. E. JACOBSON   3,261,204
FORCE MEASURING APPARATUS
Filed Dec. 24, 1963   4 Sheets-Sheet 2

INVENTOR.
WALTER E. JACOBSON
BY Lester M. Clark
ATTORNEY

July 19, 1966 W. E. JACOBSON 3,261,204
FORCE MEASURING APPARATUS
Filed Dec. 24, 1963 4 Sheets-Sheet 3

INVENTOR.
WALTER E. JACOBSON
BY Lester W. Clark
ATTORNEY

July 19, 1966  W. E. JACOBSON  3,261,204
FORCE MEASURING APPARATUS
Filed Dec. 24, 1963  4 Sheets-Sheet 4

INVENTOR.
WALTER E. JACOBSON
BY Lester W. Clark
ATTORNEY

United States Patent Office 3,261,204
Patented July 19, 1966

3,261,204
FORCE MEASURING APPARATUS
Walter E. Jacobson, Meriden, Conn., assignor to Revere Corporation of America, Wallingford, Conn., a corporation of New Jersey
Filed Dec. 24, 1963, Ser. No. 333,013
14 Claims. (Cl. 73—141)

This invention relates to force measuring apparatus of the type commonly known as a load cell. Such a load cell consists of a load supporting element or flexure which deflects under load and one or more strain sensitive electrical resistance elements attached to parts of the load cell which are subject to deflection so that the strain sensitive resistance elements are also subjected to the same deflection or strain.

The flexure comprises one or more flexible members, and the strain sensitive elements may be bonded or otherwise connected to the flexible members so as to take part of the deflections thereof. The resistance elements are connected in a Wheatstone bridge circuit or other balanceable electrical network, and the unbalance signal at the output terminals of the network is utilized as a measure of the force applied to the load cell.

A strain sensitive electrical resistance element subjected to a longitudinal tension stress increases in length with an accompanying decrease in the cross-sectional area, so that the resistance of the element increases. On the other hand, a strain sensitive element subjected to a longitudinal compressive stress decreases in length with an accompanying increase in cross-sectional area, so that the resistance of the element decreases.

The phenomenon of a variation in a lateral dimension (or cross-sectional area), which variation may be termed a lateral strain, occurring concomitantly with a longitudinal variation in dimension or longitudinal strain, is a characteristic of practically all materials. It is commonly described mathematically by the ratio of lateral strain to longitudinal strain, which is termed Poisson's ratio. It has become common to speak of changes in lateral strain accompanying changes in longitudinal strain, as "effects due to Poisson's ratio," although Poisson's ratio is not the cause of the effect in question, but simply a mathematical description of the underlying phenomenon. However, the term "effect due to Poisson's ratio" will be used in this specification in its commonly accepted sense.

Because of the effect of Poisson's ratio, the resistance of a strain sensitive electrical resistance element is an inherently non-linear function of the strain being measured. For example, the first increment of strain applied to such a resistance element produces a certain variation in the lateral strain and consequently in the resistance of the element. A subsequent increment of strain starts with the new cross-sectional dimension of the element as a datum and the increment of lateral strain is smaller for the same size of increment of longitudinal strain. While the non-linearity may be ignored over small ranges, it becomes readily apparent and must be taken into account when an attempt is made to use a strain sensitive element over a wide range of strains.

The effect of Poisson's ratio in a strain sensitive element ssbject to a tension stress is to make the resistance of the element increase more rapidly with stress than a linear increase. On the other hand, in the case of a resistance element subjected to a compressive stress, the effect of Poisson's ratio is to make the resistance decrease less rapidly as compared to the resistance which might be expected from a linear relationship.

The effect of Poisson's ratio is present in the flexible members of the load cell flexure as well as in the strain responsive electrical resistance elements. The effect of Poisson's ratio in the flexible members introduces a further non-linearity into the output of the usual load cell. This again must be taken into account if the load cell is used over a wide range of loads.

Load cells for use with relatively small loads are commonly made with their flexible elements considerably more flexible than load cells for use in measuring large loads. The increased flexibility of the flexible members means that there is a greater strain in those members and hence that there is a greater strain transferred to the strain sensitive resistance elements than is the case when the flexible members are somewhat more stiff and adapted to carry heavier loads. Consequently, the effect of Poisson's ratio is considerably more apparent in both the flexible members themselves and in the strain sensitive resistance elements in those load cells which are adapted for measuring light loads than in the case of load cells which are adapted for measuring heavier loads.

Wheatstone bridge circuits, such as those used in connection with load cells commonly consist of two input terminals and two output terminals. A network of four resistance elements interconnects the input terminals and the output terminals, each input terminal being connected through two resistance elements to the respective output terminals. If the four resistances are equal, the bridge is said to be balanced in which case there is no signal at its output terminals. It is well known that such bridge circuits are unbalanced in the same sense by similar changes in resistance in opposite arms of the bridge or by opposite changes in resistance in adjacent arms of the bridge. On the other hand, the output potential of the bridge is affected in opposite senses by similar changes in resistance in adjacent arms of the bridge or by opposite changes in resistance in opposite arms of the bridge.

A bending stress applied to a beam stresses the material along one surface of the beam in tension and the material along the opposite surface of the beam in compression. It has been proposed to mount strain sensitive resistance elements on such a beam and to connect those elements in a bridge circuit so that the tension and compression responsive strain elements are connected in adjacent arms. It has also been proposed, as described in U.S. Patent No. 2,814,946, to T. S. Harris, Jr., to construct a load cell so that one flexible member is stressed only in tension and another only in compression and to connect strain sensitive resistance elements on the two members in adjacent arms of a bridge to correct errors due to Poisson's ratio in the two elements.

An object of the present invention is to construct a load cell including a flexure responsive to either tension or compression loads to produce equal and opposite bending stresses in different flexible parts, and strain sensitive resistance elements mounted on those parts and connected in adjacent arms of a bridge circuit to balance out the effect of Poisson's ratio in the strain sensitive elements.

A further object is to construct a load cell of the type described in which additional resistance elements are mounted on the flexible parts and are connected in the bridge circuit so as to balance out the effects of Poisson's ratio in the flexure.

A further object is to provide a load cell having a small size and weight and adapted to measure light loads. A further object is to provide such a small load cell which has a small deflection for light loads.

Another object is to provide a load cell having a high degree of linearity of output with variation in load.

Another object is to provide a load cell which is adaptable for use over a dual range of load, i.e., it is suitable with one calibration for a small range of loads, and with a different calibration for a wider range of loads.

Another object is to provide a load cell of the type described in which the strain sensitive resistance elements are not affected by changes in the ambient temperature.

Another object is to provide a load cell of the type described in which the strain sensitive resistance elements are not affected by changes in the ambient pressure.

The foregoing and other objects of the invention are attained in the various modifications of apparatus described herein. In all of those modifications, the load cell includes a flexure construction having two generally parallel flexible members, with the force to be measured applied at one end of one member and the reactive force applied at the opposite end of the other member. Both forces act in tension or compression, but their lines of action are offset with respect to the centers of gravity of the cross-sectional areas of the two members, so that the forces are effective to apply bending moments to the members. Consequently, one member is stressed in tension and bending, and the other in compression and bending. The ends of the two members opposite the ends where the forces are applied are connected through a bridging member. The two flexible members together with this bridging member form a U-shaped flexure. In certain modifications of the invention, the parallel members have their ends to which the forces are applied extended so that the structure as a whole takes on roughly the shape of a G. In another modification, four parallel flexible elements are employed, and the structure as a whole takes on the contour of a W.

In all of the modifications of the invention described herein, two strain sensitive resistance elements are mounted on or are attached to the two flexible members at localities equally spaced with respect to the line of action of the force to be measured and the reaction force. One of the two flexible members has a compressive stress developed in it, and the other flexible member has a tensile stress developed in it. Consequently, the two resistance elements are subjected to equal and opposite variations in resistance. The two elements are connected in adjacent arms of a bridge circuit, so that their opposite resistance variations are cumulative with respect to the unbalance of the bridge, and so that the errors introduced into the measurement by the effects of Poisson's ratio in the elements cancel each other.

In certain modifications of the invention, four resistance elements are utilized, two on the inner surfaces of the two flexible members and two on the outer surfaces of those members. When that configuration is employed, the circuit compensates for the effect of Poisson's ratio, not only in the resistance elements themselves, but also in the flexible members of the flexure structure.

One modification of the invention described herein employs a G-type flexure with a right angle slot separating the two ends of the flexure. The arrangement is such that when the force applied exceeds a predetermined value, the slot is closed. Thereafter, any further changes in the applied force do not affect the resistance elements on the parallel flexible members. One of the structures which transmits a force to one end of the flexure element is provided with additional resistance elements which are then effective to measure the applied force. Thus a dual range load cell is provided.

In another modification of the invention, the flexure structure and its associated resistance elements are located within a sealed unit having a double diaphragm arrangement for balancing out the effect of variations in the ambient pressure. In still another modification, the load cell is located within a closed housing and is effective to measure the force applied to a flexible diaphragm, so that the load cell may serve as a pressure transducer.

Figure 1:
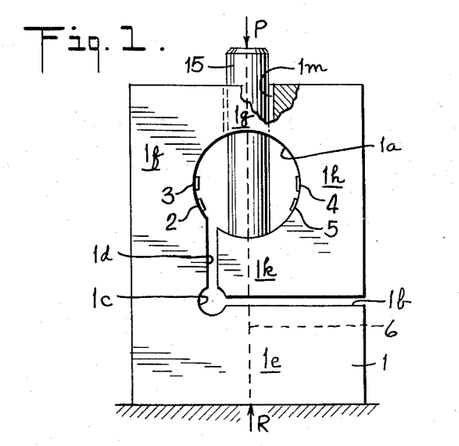
FIG. 1 is a somewhat diagrammatic elevational view of one form of force measuring apparatus embodying the invention.
Figure 2:
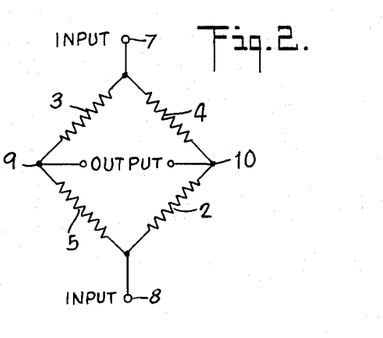
FIG. 2 is an electric wiring diagram of a bridge circuit for use in connection with the force measuring apparatus of FIG. 1.

Other objects and advantages of the invention will become apparent from the consideration of the following specification and claims, taken together with the accompanying drawings. In the drawings:

FIGS. 1 AND 2

FIG. 1 illustrates a force measuring apparatus constructed in accordance with the invention, including a flexure 1 and four strain sensitive resistance elements 2, 3, 4 and 5.

The flexure 1 is made from a single block of material, e.g., steel, having a cylindrical aperture $1a$, extending through it from front to back, as viewed in FIG. 1. A horizontal slot $1b$ is cut in the body 1 from the right hand surface toward the lefthand surface and extending completely through the block from front to back. The left end of the slot $1b$ terminates in a cylindrical bore $1c$, also extending through the flexure 1 from front to back. A vertical slot $1d$ extends through the flexure from front to back and between the bore $1c$ and the cylindrical aperture $1a$.

The flexure 1 thus consists of a base portion $1e$ supported on a suitable underlying fixed support, a first flexible member $1f$ extending upwardly from the base $1e$, a force transmitting bridge member $1g$ extending to the right from the upper end of the flexible member $1f$ and connected at its right end to another vertical flexible member $1h$. At the lower end of the flexible member $1h$, a foot member $1k$ extends to the left.

The bridge member $1g$ is provided with a central vertical bore $1m$, which extends from the upper surface of the flexure 1 into the aperture $1a$. A column 15 extends from above the upper end of the flexure 1 through the aperture $1m$ and has its lower end attached, as by welding, to the foot member $1k$.

The force P to be measured is applied at the upper end of the column 15. As indicated by the arrow in the drawing, the force P may be a downwardly acting force. That force is opposed by a reactive force R acting upwardly on the base $1e$, and aligned with the force P. In any flexure constructed in accordance with the present invention, the two generally parallel stiffly flexible members $1f$ and $1h$, and the connecting bridge member 1g extending between corresponding ends of the two flexible members, are essential. The structures at the opposite ends of the flexible members 1f and 1h, by which the forces to be measured and the reaction force are applied to those members, may take various forms without departing from the invention. However, the particular form illustrated in FIG. 1 for the flexure 1 is one of the preferred embodiments of the invention. The particular form of flexure 1 has become known as the G-type flexure, although it is recognized that the flexure 1 has a contour which only roughly approximates the shape of a G.

The slots 1b and 1d and their connecting aperture 1c, which provide an opening between the central aperture 1a and the periphery of the block 1 may take various forms without departing from the scope of the invention, as will become apparent from a comparison of the other modifications of flexure structure described in this application. It should be noted that in all the modifications, the flexure structure includes a flexible body member which extends from one side of an aperture, in this instance 1d, continuously around the periphery of a cylindrical aperture, in this instance 1a, to the opposite side of the slot 1d. One of the forces concerned is applied to the structure in a generally radial direction with respect to the aperture 1a, and at one end of the structure defining the periphery of that aperture. The other of the two forces is applied in the opposite direction to the other end of the structure defining the periphery of the aperture.

The flexible members 1f and 1h each have a narrow neck portion adjacent the middle of their lengths, between the aperture 1a and the outer plane surfaces of the flexure 1. At these narrow neck portions, the stresses in the flexible members 1f and 1h are concentrated. That is to say, the material at the neck is subjected to greater stress than the material at other localities along the members 1f and 1h. On the surfaces of the aperture 1a at the neck portions, there are mounted strain sensitive resistance elements 3 and 4. Note that the elements 3 and 4 are located at equal distances from the line 6 which represents the line of action of the force P to be measured and the reaction force R. Just below the resistance elements 3 and 4, are mounted a second pair of strain sensitive resistance elements 2 and 5, respectively. Although the elements 2 and 5 are shown below the resistance elements 3 and 4, it will be recognized by those skilled in the art that the elements 2 and 5 are commonly mounted side by side with the elements 3 and 4 at the neck portion of the members 1f and 1h. The elements 2 and 5 are shown below the elements 3 and 4 simply for convenience in making the drawing.

The bridge circuit of FIG. 2 includes a pair of input terminals 7, 8 and a pair of output terminals 9, 10. Input terminal 7 is connected to the respective output terminals 9 and 10 through the resistors 3 and 4, respectively. Input terminal 8 is connected to the output terminals 9 and 10 through the resistors 5 and 2, respectively.

Referring to FIG. 1, it may be seen that the force P acts downwardly on the bottom of the flexible member 1h, and the reaction force R acts upwardly on the upper end of the member 1h. Consequently, the member 1h is stressed in tension by those forces. On the other hand, the force P acts downwardly on the top of the flexible member 1f and the reaction force R acts upwardly on the bottom end of the member 1f. Consequently, the member 1f is stressed in compression by those forces. Furthermore, the forces P and R apply bending moments to each of the flexible members 1f and 1h. These bending moments act on the member 1f in a direction to move its upper end to the right, as viewed in FIG. 1, so that the righthand surface of the member 1f, where the resistors 2 and 3 are located, is stressed in compression by those bending moments. The same bending moments act in the same sense on the member 1h, i.e., they tend to move its upper end to the right with respect to its lower end, so that the material of the member 1h adjacent the strain sensitive elements 4 and 5 is stressed in tension by the bending moments.

The members 1f and 1h are of equal cross-sectional area, and the centers of gravity of thin cross-sectional areas are spaced equally from the line of forces indicated at 6. Furthermore, the resistance elements 3 and 4 are located at equal distances from the line 6. The resistance elements 2 and 5 are also located at equal distances from the line 6. Consequently, the resistance elements 3 and 4 are subjected to equal strains, but in opposite senses, i.e., the resistance element 3 is subjected to a compression stress and the resistance element 4 is connected to a tension stress.

Figure 3:
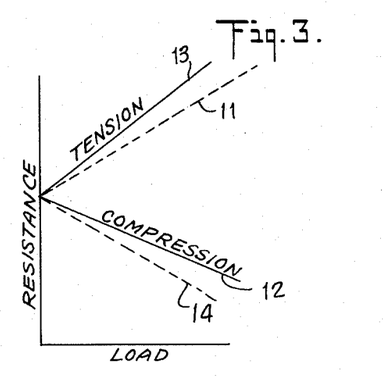
FIG. 3 is a graphical illustration of the variation of resistance with load in strain sensitive elements of the type used in the force measuring apparatus of the invention.

FIG. 3 shows, with some exaggeration, the relationship between load and resistance in a strain sensitive element such as the resistance elements 2, 3, 4 and 5. The dotted line 11 shows an ideal linear relationship between load and resistance, for tension loads. The line 13 shows the actual relationship between load and resistance which is encountered when a physical resistance element is subjected to a tension stress. Note that the points on the curve 13 are above the corresponding points on the idealized curve 11. In other words the resistance of the element subjected to a tension stress is higher than the desired ideal by an error which is due to Poisson's ratio, as described above. Similarly, the variation in resistance with load, when a physical element is subjected to a compression stress is illustrated by the curve 12. Dotted curve 14 shows the corresponding ideal linear relationship. It may there be seen that the actual resistance encountered is again somewhat higher than the resistance expected from the idealized curve 14.

OPERATION OF FIGS. 1 AND 2

The strain sensitive resistance elements 3 and 4 are subjected to strains in opposite senses. That is to say, the element 3 is subjected to a compressive stress and the element 4 is subjected to a tension stress. Element 3 therefore tends to decrease in resistance whereas element 4 increases in resistance. Since these two elements are connected in adjacent arms of the bridge, the variations in opposite senses of their respective resistances act cumulatively on the output of the bridge and produce an increased output signal, greater than would be produced by either resistance element acting alone. On the other hand, the error due to Poisson's ratio in resistance element 3 consists in a non-linear increase of its resistance above the desired value. At the same time, the error in element 4 due to the same effect causes an increase in its resistance above the desired value.

Thus, the resistance of both the elements 3 and 4 is increased beyond the linear values by the effect of Poisson's ratio. Consequently, these are similar effects in adjacent arms of the bridge. Hence, they oppose each other and tend to balance one another out. It has been found that they balance out in practice to a high degree, resulting in an error due to Poisson's ratio of less than 0.02%.

Resistance elements 2 and 5 act in the same way as elements 3 and 4, and the effects of the two pairs of resistance elements are cumulative.

Figure 4:
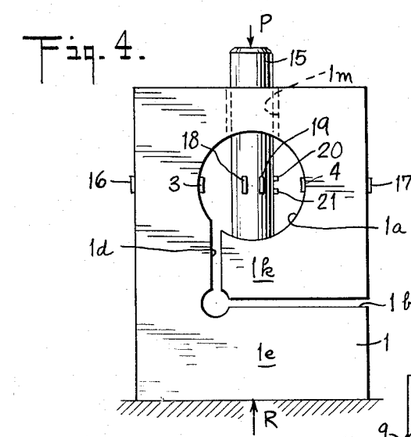
FIG. 4 is a view similar to FIG. 1, illustrating a modification of the invention employing additional resistance elements.
Figure 5:
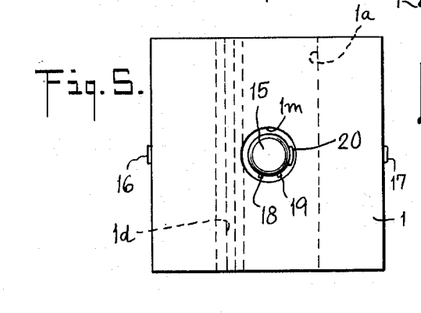
FIG. 5 is a plan view of the structure of FIG. 4.
Figure 6:
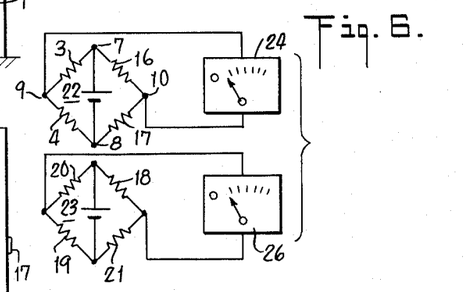
FIG. 6 is an electrical wiring diagram of a circuit connecting the resistance elements in the apparatus of FIGS. 4 and 5.

FIGS. 4 TO 6

These figures illustrate a modification of the force measuring apparatus illustrated in FIGS. 1 and 2. In FIGS. 4 to 6, those elements which correspond in the structure and function to their counterparts in FIGS. 1 and 2 have been given the same reference numerals, and will not be further described.

Referring to FIG. 4, the structure there shown differs from the structure shown in FIG. 1 in that the two resistance elements 2 and 5 of FIG. 1 have been omitted.

Resistance elements 16 and 17 have been added to the outsides of the flexible members 1f and 1h. Resistance elements 18 and 19 are mounted on the column 15 and extend longitudinally of that column. Resistance elements 20 and 21 are also mounted on the column 15, but have their long dimensions extending circumferentially of that column.

When the flexure 1 of FIG. 4 is subjected to stress by the forces P and R then the resistance element 16 is subjected to a compression stress and the resistance element 17 is subjected to a tension stress. Referring to FIG. 6, it may be seen that the four resistance elements 3, 4, 16 and 17 are connected in a Wheatstone bridge circuit 22. The elements 3 and 4 are connected in adjacent arms of the bridge, so their changes in resistance, being opposite in sense, act cumulatively just as they did in FIG. 2 and the errors due to Poisson's ratio in these two elements are compensated. This action is the same as in FIG. 2, even though the elements 3 and 4 are in a different pair of adjacent arms of the bridge then they were in FIG. 2. Similarly, the resistance elements 16 and 17 are connected in adjacent arms of the bridge so that their variations in resistance act cumulatively with respect to the measurement of the force, while the errors due to Poisson's ratio act against each other in those two elements and cancel out.

Furthermore, note that the resistance elements 3 and 16 are both subject to compressive stress in the flexible element 1f and that resistance elements 4 and 17 are both subject to tension stress in the flexible element 1h. However, elements 3 and 16 are connected in adjacent arms of the bridge, so that the variations in compressive stress in the flexible member 1f affect both elements 3 and 16 similarly and hence do not affect the bridge output. Similarly, any changes in the resistance elements 4 and 17 due to variations in the tension stress in member 1h cancel each other out in the bridge circuit 22. Consequently, the output of the bridge circuit 22 is determined solely by the bending stresses in the members 1f and 1h and is not affected by the compression and tension stresses in those members.

The resistance elements 18, 19, 20 and 21 are connected in a Wheatstone bridge circuit 23, appearing in FIG. 6. Note that each resistance element 18 and 19 which is subject to a compression stress in the column 15 is connected in an arm of the bridge adjacent to an arm containing on the resistance elements 20 and 21, which are subject to tension stresses due to the forces P and R. Hence, the resistance changes in the compression elements are cumulative with resistance changes in the tension elements, with respect to their unbalance effects in the bridge circuit.

As the load on the flexure 1 due to the forces P and R increases, the foot member 1k is moved downwardly, and eventually abuts against the base 1e. Thereupon, any further increase in the forces P and R are not reflected in changes in the strains of the resistance elements 3, 4, 16 and 17. Referring to FIG. 6, it may be seen that an output of the bridge 22 is connected to an indicator 24. The indicator 24 is effective only during the range of variation of those forces below the point where the slot 1b closes. The indicator 26 is effective over the full range of variation of the forces P and R. Indicator 24 is calibrated for a relatively small range of forces while indicator 26 is calibrated for a somewhat wider range of forces.

The load cell of FIGS. 4–6 and in fact all the load cells described in this application, except that in FIG. 1, are inherently insensitive to changes in ambient temperature, since all the resistance elements are affected equally by such changes due to conduction through the flexure structure. Consequently, the effects of such changes cancel each other out in the bridge circuit, so that the bridge circuit output remains unaffected. In a similar manner, the load cells disclosed are relatively insensitive to temperature gradients occuring in the load cells themselves. For example, when the load cell of FIG. 4 is subjected to a temperature gradient applied through the loading surface, that temperature gradient reaches the resistance elements 18, 19, 20 and 21 substantially concurrently. The effects of the gradient at that point are balanced out in the bridge circuit 23. Similarly, as the gradient travels along the metal mass of the flexure, it reaches the resistance elements 4 and 17 at the same time, and its effects on those elements are cancelled out. The operation is the same with respect to the resistance elements 3 and 16. Furthermore, in the specific form of apparatus shown in FIG. 4, the increase in mass subject to the temperature gradient which occurs at the bottom of the column 15 is effective to reduce the steepness of the temperature gradient in its subsequent passage through the other parts of the flexure.

FIGS. 7 TO 11

Figure 7:
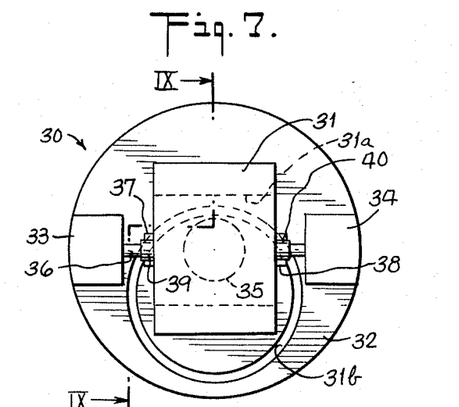
FIG. 7 is a plan view of a modified form of force measuring apparatus embodying certain features in the invention.
Figure 8:
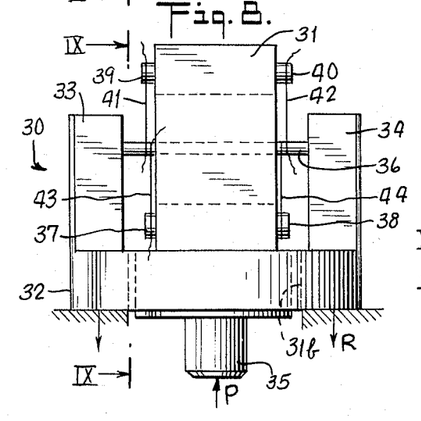
FIG. 8 is an elevational view of the apparatus of FIG. 7.
Figure 9:
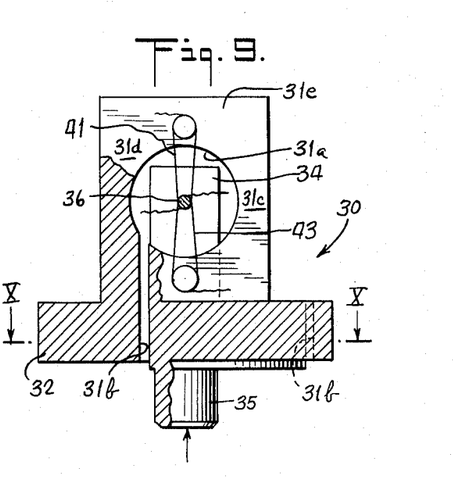
FIG. 9 is a side view of the apparatus of FIGS. 7 and 8.
Figure 10:
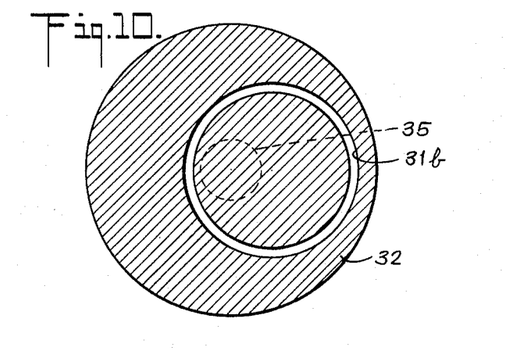
FIG. 10 is a cross-sectional view taken on the line X—X of FIG. 9, looking in the direction of the arrows.

These figures illustrate a modification of the invention utilizing unbonded resistance elements, in place of the bonded elements such as 3, 4, 16 and 17 in the apparatus of FIGS. 1–6. In FIGS. 7, 8 and 9, there is shown a flexure member 30 formed from a single block of material and consisting of an elongated central body 31, of generally rectangular cross-section, having a flange 32 at its lower end and a cylindrical aperture 31a extending through the body 31 from side to side, as viewed in FIGS. 7 and 8. Projecting upwardly from the outer parts of the flange 32 are a pair of posts 33 and 34, whose upper ends are aligned with the aperture 31a. An annular slot 31b is cut through the flange 32 and the body 31, and is eccentric with respect to the periphery of flange 32. The slot 31b intersects the aperture 31a and effectively separates the lower end of the body 31 into two parts, thereby forming in that body two flexible members 31c and 31d, corresponding respectively to the flexible members 1f and 1h of FIG. 1. The upper ends of the flexible members 31c and 31d are connected by a bridging member 31e.

The force P to be measured is shown as applied to a column 35 attached to the bottom of the body 31 inside the annular slot 31b. The reaction force is applied to the periphery of the flange 32 and is distributed around that periphery, although the resultant force of reaction acts along the same line as the force P.

A rigid insulated bar 36 is mounted on the posts 33, 34 and extends through the center of the aperture 31a. A pair of rigid insulated studs 37, 38 are mounted on the body 31 just above the flange 32 and on that portion of the body which is within the annular slot 31b. A similar pair of studs 39, 40 are mounted on the bridging member 31e at the opposite sides thereof.

Figure 11:
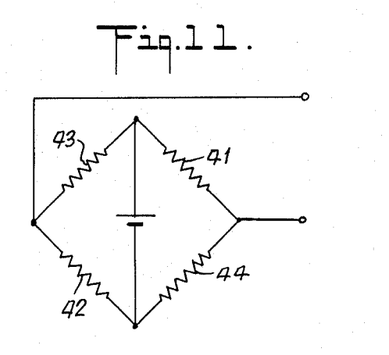
FIG. 11 is a wiring diagram of a bridge circuit connecting the resistance elements of the apparatus of FIGS. 7 to 9.

Two strain sensitive electrical resistance elements 41 and 42 are stretched between the studs 39 and 40 on the one hand and the rigid rod 36 on the other hand. Another pair of strain sensitive electrical resistance elements 43 and 44 are stretched between the studs 37 and 38 on the one hand and the rigid rod 36 on the other hand. The resistance elements 41, 42, 43 and 44 are all placed under tension when the flexure 30 is constructed. When the forces P and R are applied, some of the tension is released in the resistance elements 43 and 44, while the resistance elements 41 and 42 are placed under increasing tension. In other words, the resistance elements 43 and 44 react as if placed under a compressive stress while the resistance elements 41 and 42 react as if under a tension stress. The connection of the resistance elements in the bridge circuit of FIG. 11 is analogous to the connection of the corresponding elements in the bridge circuit 23 of FIG. 6. In other words, each resistance element stressed in tension by a force is connected in an arm of the bridge adjacent to another resistance element which is stressed in compression by the same force. Consequently, the errors due to Poisson's ratio tend to cancel.

A load cell such as that described in FIGS. 7 to 11, including unbonded resistance elements, is used where the capacity of the load cell is relatively small, e.g., below about ten pounds. In such a load cell, the flexure element must be made rather thin so that it will be deflected by the small forces to be measured. With such a thin flexure, if a bonded resistance element is used, the adhesive used for bonding effectively becomes an appreciable part of the flexure. Its spring rate must be considered along with the spring rate of the flexure in calibrating the load cell. Since the spring rate of commonly used adhesives is highly unpredictable, such a structure is not suitable in a precision load cell intended for relatively small forces.

By utilizing the unbonded technique and isolating the resistance elements from the flexure, the influence of the adhesives on the spring rate is eliminated. In this manner, there may be constructed a load cell having a range from 0.01 pounds to 10 pounds, with a strain of 1400 microinches on the strain sensitive resistance elements, thus producing an electrical output signal comparable to those which are obtained with more conventional strain gages of larger capacity.

In the arrangement shown in FIGS. 7 to 9, the resistance elements 43 and 44 are subjected to the entire strain between the two free ends of the flexure, while the resistance elements 41 and 42 are subjected only to the strain between the reaction end of the flexure, to which rod 36 is attached, and the midpoint of the flexure, to which the studs 39 and 40 are attached. The inequality between these strains may be compensated, for example, by adding fixed resistance elements in appropriate arms of the bridge circuit.

Figure 12:
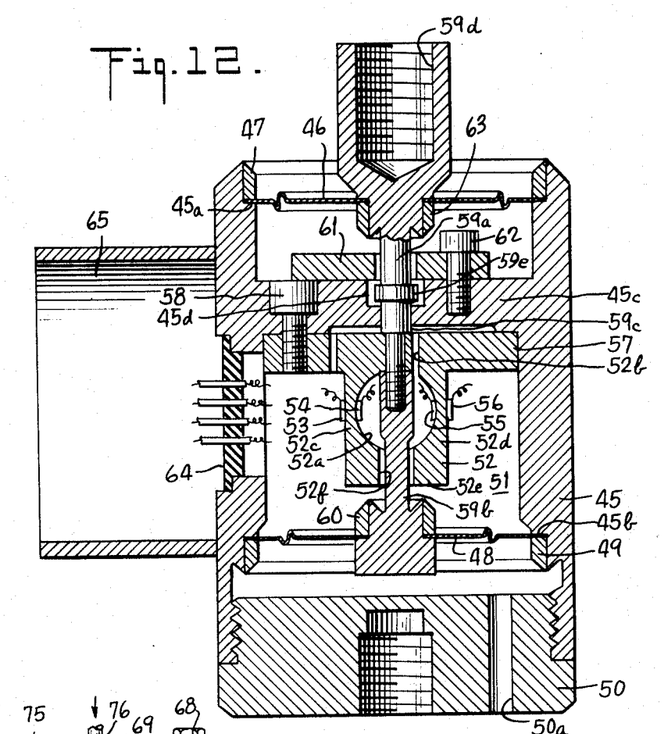
FIG. 12 is a cross-sectional view of a modified form of the invention including ambient pressure compensating means.

FIG. 12

This figure illustrates a force measuring apparatus constructed in accordance with the invention and arranged so that readings of the force measuring apparatus are not affected by variations in ambient pressure.

The force measuring apparatus of FIG. 12 is enclosed in a cylindrical housing 45, open at its upper and lower ends as they appear in the drawing. The upper end of the housing, as it appears in the drawing, is closed by a flexible diaphragm 46, having the under surface of its periphery abutting a shoulder 45a formed in the housing. The upper surface of the periphery of the diaphragm is welded to a retainer ring 47, which is in turn welded to the housing 45.

Another diaphragm 48 extends across the housing somewhat below the center thereof and has the upper surface of its periphery abutting a shoulder 45b on the housing. A retainer ring 49 is welded to the lower surface of the periphery of diaphragm 48 and is also welded to the housing 45. The lower end of the housing is closed by a base plug 50, which is externally threaded to engage an internal thread in the housing. At its center, the plug 50 is provided with a threaded recess through which a force to be measured or a reaction force may be applied. The plug 50 is provided with a vent hole 50a, through which atmospheric pressure may enter the space within the housing and below the diaphragm 48.

The two diaphragms 46 and 48, together with the housing, enclose and define a chamber 51. Within the chamber 51 are located the principal parts of the force measuring apparatus, including a flexure 52 on which are mounted four strain sensitive resistance elements 53, 54, 55 and 56.

A transverse septum 45c integral with the housing 45 is located within the chamber 51 and extends across the interior of the housing.

The flexure 52 is generally similar to the flexure 31 of FIGS. 7 to 9, but differs therefrom in certain respects. The flexure 52 includes a central elongated body extending along the axis of the housing 45 and provided at its upper end with a peripheral flange 57. The flange 57 is attached to the septum 45c by means of machine screws 58. The flexure 52 has a cylindrical aperture 52a bored therethrough from front to back, as viewed in the drawing, and an annular slot 52b extending through the flange 57 and a portion of the central body of flexure 52, the slot extending between the cylindrical aperture 52a and the upper surface of the flexure 52. The aperture 52a and the slot 52b cooperate to define in the flexure 52, two elongated generally parallel flexible members 52c and 52d connected only at their lower ends through a bridging member 52e. The bridging member 52e is provided with an aperture 52f at its center, said aperture extending axially of the housing 45.

A column consisting of an upper column section 59a and a lower column section 59b, which are threaded together at their adjacent ends, also extends axially of the housing. The lower end of the lower column section 59b is provided with an upwardly facing shoulder. The diaphragm 48 is apertured at its center to receive the column section 59b, with the under surface of the diaphragm abutting the upwardly facing shoulder. The upper surface of the inner margin of diaphragm 48 is welded to a retainer ring 60, which is in turn welded to the column section 59b. The lower column section 59b extends upwardly through the aperture 52f, and its upper end abuts against a surface of the flexure 52 which is connected to the upper end of flexible member 52c.

The upper column section 59a is provided with a shoulder 59c, which abuts against the upper surface of the flexure 52 opposite the upper end of the lower column section 59b. Thus, that part of the flexure 52 which is directly connected to the upper end of flexible member 52c is clamped between the shoulder 59c and the upper end of the lower column section 59b, and is thus rigidly attached to the central column.

The septum 45c is provided at the center of its upper surface with a recess 45d. Within the recess 45d, the upper column section 59a carries a flange 59e which is normally spaced above the bottom of the recess 45d and below the top of that recess.

An overload stop plate 61 is affixed to the top of the septum 45c by means of bolts 62.

The upper end of the column section 59a is provided with a central threaded recess 59d for receiving any suitable force applying means, which may apply either a force to be measured or a reaction force. The upper column section 59a is provided with a shoulder. Diaphragm 46 is apertured at its center to receive the column section 59a, with the upper surface of the diaphragm abutting the shoulder. The lower surface of the diaphragm is welded to a retainer ring 63, which is in turn welded to the column section 59a.

The housing 45 is provided with a lateral aperture closed by an insulating plate 64, through which electrical connections to the resistance elements 53, 54, 55 and 56 may pass. A junction box 65 is attached to the outside of the housing 45 to receive the conductors passing through the insulating plate 64 and to provide mountings for bridge circuit terminals. Other electrical components of the bridge circuits may be mounted in the junction box 65.

OPERATION OF FIG. 12

The flexure 52 and the resistance elements mounted thereon function in substantially the same way in FIG. 12 as the flexure 1 and resistance elements 16, 3, 4 and 17 of FIG. 4. The apparatus of FIG. 12 may be utilized to measure a compression force acting downwardly on the central column 59 against a reaction force acting upwardly on the base plug 50. Alternatively, it may be used to measure a tension force acting upwardly on the column 59 against a downwardly acting reaction force applied to the base plug 50. If the central column 59 is overloaded in either direction, the flange 60 abuts against either the septum 45c or the overload stop plate 61 and transfers its excess load directly to the housing 45 without having that excess load carried by the flexure 52.

The pressure in the chamber between the two diaphragms 46 and 48 acts upwardly on diaphragm 46 and downwardly on diaphragm 48. Similarly, the ambient pressure acts downwardly on diaphragm 46 and upwardly on diaphragm 48. Since the two diaphragms have substantially equal areas, as shown in the drawing, the forces due to those pressures are balanced and the measurement of the applied force acting on column 59 is not affected by variations in those pressures.

Figure 13:
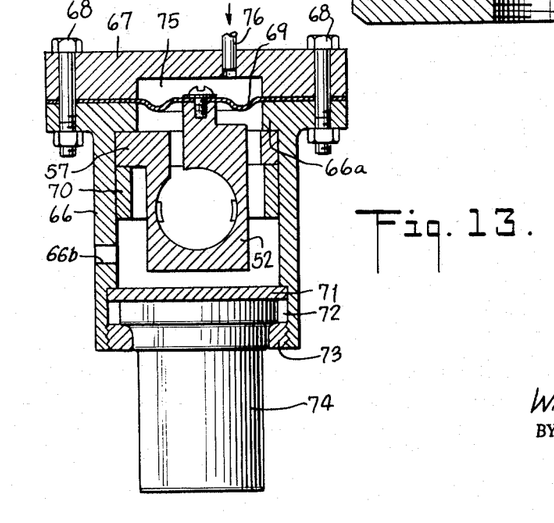
FIG. 13 is a cross-sectional view of a pressure transducer embodying the invention.

FIG. 13

This figure illustrates a modification of the invention in which a flexure such as the flexure 52 of FIG. 12 is employed in a pressure transducer.

In FIG. 13, the pressure transducer including a flexure 52 is enclosed within a cylindrical housing 56 open at its upper and lower ends. The upper end of housing 66 is closed by a top plate 67 held in place by bolts 68. A flexible diaphragm 69 has its periphery clamped between the top plate 67 and the upper end of the housing 66. The center of the diaphragm 69 is attached by any suitable means to the upper end of one flexible member of the flexure 52. The other flexible member of flexure 52 is attached to the flange 57 on the flexure, which flange is held in place against a flange 66a on the housing 66 by means of a clamping ring 70.

The lower end of the housing 66 is closed by an insulating plate 71 held in place by a spacer ring 72 and a clamping ring 73. The insulating plate 71 serves as a connector for conductors connected to the resistance elements (not shown) mounted on the flexure 52 so as to provide leads connecting those resistance elements to conductors in a cable 74 held in place by the clamping ring 73.

A chamber 75 is defined between the top plate 67 and diaphragm 69 and is connected through a conduit 76 to a source of fluid pressure to be measured. That pressure acts downwardly on diaphragm 69 and thus applies a downward force to the upper end of the central flexible member of the flexure 52. Through its resistance elements, the flexure 52 measures that force, and since the area of diaphragm 69 subjected to the pressure in chamber 75 is a constant, that force may be regarded as a measure of the pressure in the chamber 75. The output of the force measuring apparatus may be calibrated in terms of pressure.

The housing 66 is vented to the atmosphere at 66b, so that the transducer measures gage pressure, rather than absolute pressure.

Figure 14:
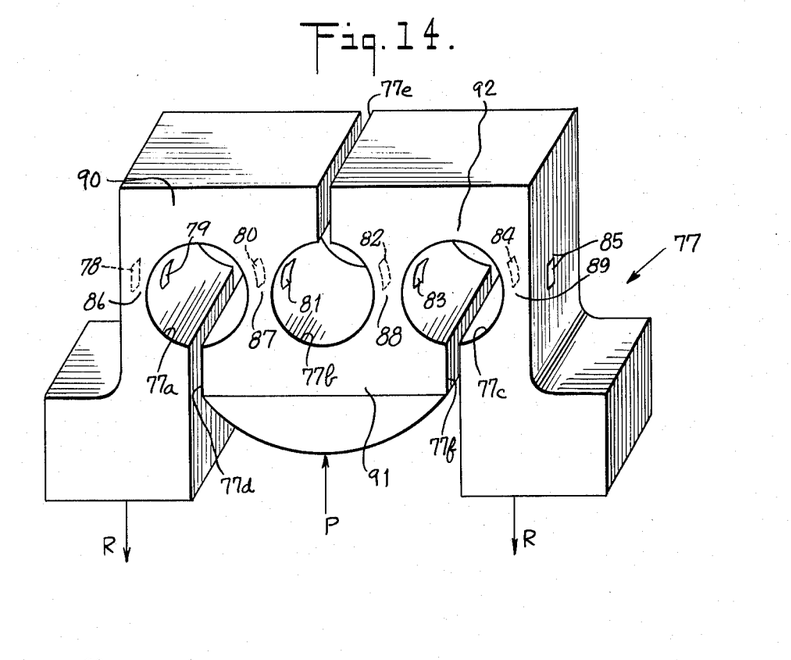
FIG. 14 is a perspective view of a modified form of force measuring apparatus embodying the invention.
Figure 15:
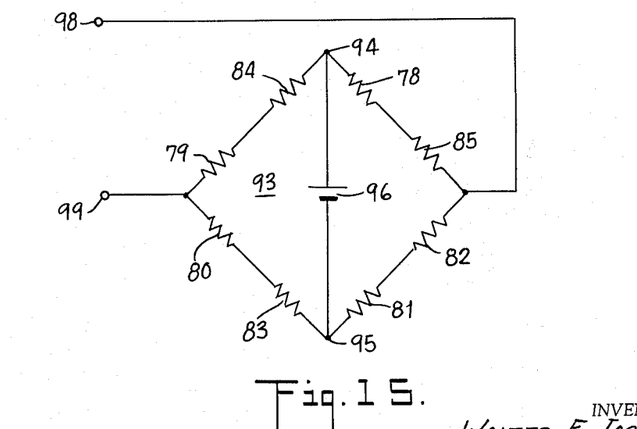
FIG. 15 is a wiring diagram showing the electrical connections of the resistance elements employed in the force measuring apparatus of FIG. 14.

FIGS. 14 AND 15

These two figures illustrate an alternative form of force measuring apparatus embodying the invention. This force measuring apparatus includes a flexure 77 having eight strain sensitive resistance elements 78 to 85 bonded thereto.

The flexure 77 is preferably made from a single block of material, e.g., steel, by boring through the block three parallel cylindrical apertures 77a, 77b and 77c, extending from front to back as they appear in the drawing. A slot 77d extends from the aperture 77a to the bottom of the block 77, and also extends from front to back of the block. Another slot 77e extends from the aperture 77b to the top of the block and also extends from front to back of the block. A third slot 77f extends from the aperture 77c to the bottom of the block, and also extends through the block from front to back. It may be seen that the entire flexure has roughly the contour of an inverted W and it may be spoken of herein as a W-type flexure.

The apertures 77a, 77b and 77c, together with the slots 77d, 77e and 77f cooperate to define in the flexure 77 four generally parallel flexible members 86, 87, 88 and 89. The upper ends of the flexible members 86 and 87 are connected by a bridging member 90. The lower ends of the flexible members 87 and 88 are connected by a bridging member 91. The upper ends of the flexible members 88 and 89 are connected by a bridging member 92. The force to be measured, or the reaction force is applied to the under surface of the bridging member 91, and it may act either upwardly, as shown, or downwardly. The reaction forces are applied to the bottoms of the flexible members 86 and 89 and they act of course in the direction opposite to the force to be measured.

When the force P to be measured acts upwardly on the bridging member 91, as shown, then the flexible members 87 and 88 are stressed in compression and bending, and the flexible members 86 and 89 are stressed in tension and bending. In the flexible member 86, the strain sensitive elements 78 and 79 are both stressed in tension by the tension forces acting on member 86. Furthermore, the element 78 is stressed in compression by the bending moments and the element 79 is stressed in tension by the bending moments. Since the two resistance elements 78 and 79 are connected in adjacent arms of a bridge circuit as shown in the circuit 86 of FIG. 15, the effects of the tension forces in member 86 are balanced in the output of the bridge. In the case of the bending forces, the effects of the two bending strains are cumulative on the output of the bridge circuit 86, but the effects of Poisson's ratio are counterbalanced and cancelled out.

It may be observed that the effects are the same on all the other pairs of resistance elements, namely the pair 80 and 81 on the flexible member 87, the pair 82 and 83 on the flexible member 88, and the pair 84 and 85 on the flexible member 89. In each case, the variations in resistance of the strain sensitive elements due to compression or tension are cancelled out, and the effects due to the bending moments are cumulative, and thus increase the output of the bridge.

The bridge circuit 93 of FIG. 15 is illustrated as having input terminals 94 and 95 connected to the opposite terminals of a battery 96, and output terminals 98 and 99. The bridge circuit 93, and in fact, any of the bridge circuits illustrated in this application may use any convenient source of electrical energy, either a direct current source or an alternating current source.

While I have shown and described certain preferred embodiments of my invention, other modifications thereof will readily occur to those skilled in the art, and I therefore intend my invention to be limited only by the appended claims.

I claim:
1. Force measuring apparatus, comprising:
    (a) two elongated generally parallel stiffly flexible members;
    (b) bridging means connecting one end of one member to the adjacent end of the other member;
    (c) means for applying a force to be measured only to the other end of one of the two members and acting along a line parallel to the length of said member but spaced therefrom;
    (d) means for applying a reactive force only to the corresponding end of the other member and acting along a line parallel to the length of said other member but spaced therefrom;
    (e) said bridging means having a central aperture parallel to said members;
    (f) one of said force applying means comprising:
        (1) a column extending through said aperture; and
        (2) means connecting the column to the end of one of said members farthest from said bridging means;
    (g) the other of said force applying means comprising a lateral extension on the corresponding end of said other member and adapted to apply a resultant force acting along the same line as but opposed to the force applied through said column;
    (h) said members, said two force applying means, and said bridging means cooperating to stress one member in tension and bending and the other member in compression and bending;
    (i) a plurality of strain sensitive electrical resistance elements;

(j) means connecting said strain sensitive elements to said members so that their resistances vary as functions of the strains therein;

(k) said strain sensitive elements being adapted for connection in an electrical network so that resistance variations in the elements produce cumulative effects on an electrical output condition of the network.

2. Force measuring apparatus as defined in claim 1, in which:

(a) said lateral extension is aligned with the column and spaced longitudinally of the members from the member end that is connected to the column.

3. Force measuring apparatus as defined in claim 1, in which said lateral extension is annular and its periphery is concentric with said column.

4. Force measuring apparatus as defined in claim 1, comprising:

(a) two elongated strain sensitive resistance elements bonded to said column and extending longitudinally thereof, so as to be stressed in tension when the column is stressed in tension and in compression when the column is stressed in compression;

(b) two elongated strain sensitive resistance elements bonded to said column and extending peripherally thereof, so as to be stressed in compression when the column is stressed in tension and vice versa; and (c) a bridge circuit including said four resistance elements, with each pair of adjacent arms of the bridge including one longitudinal element and one peripheral element.

5. Force measuring apparatus, comprising:

(a) an integral piece of material having
   (1) a cylindrical aperture extending therethrough and equally spaced from opposite outside faces of said piece, so as to provide sections of equal dimensions at the sides of the piece nearest said faces; and
   (2) a slot extending the entire axial length of the cylindrical aperture and also extending outwardly from the aperture to the periphery of the piece so that said integral piece constitutes a slotted ring extending from an end adjacent one side of the slot around the aperture to an end adjacent the other side of the slot;

(b) means for applying a force to be measured to the ring on one side of the slot and acting effectively along a line at right angles to the axis of the cylindrical aperture and equidistant from said sections of equal dimension;

(c) means for applying a reactive force in the opposite direction effectively along said line to the end of the ring on the opposite side of the slot; and (d) strain sensitive means attached to the piece at said sections of equal dimensions for measuring the relative movement of the two ends thereof.

6. Force measuring apparatus, as defined in claim 5, in which:

(a) said piece has a pair of opposed parallel plane faces, and a third face intersecting the planes of both of said parallel faces;

(b) the axis of said cylindrical aperture extends at right angles to said parallel plane faces; and (c) said slot extends from said cylindrical aperture to the third face.

7. Force measuring apparatus as defined in claim 5, in which said slot has two portions intersecting at right angles, one of said portions also intersecting said cylindrical aperture and the other of said portions also intersecting the periphery of the piece.

8. Force measuring apparatus as defined in claim 5, in which:

(a) said piece has an integral flange about the periphery of one end;

(b) said aperture has its axis parallel to said flange and extends between two sides faces of the piece; and (c) said slot is annular and extends through the flanged end of the piece, with its axis eccentric with respect to said flanged end.

9. Force measuring apparatus, comprising:

(a) an integral piece of material having
   (1) three parallel cylindrical apertures extending therethrough; and
   (2) three slots, each extending the entire axial length of one of the three cylindrical apertures and each extending outwardly from its associated aperture to the periphery of the piece, said slots being parallel and the slot associated with the center one of the three apertures extending from its aperture in the opposite direction to the slots associated with the end apertures, so that the piece has four legs defining the apertures and forming the general contour of the letter "W";

(b) means for applying one of two opposing forces to the outside of the piece at a locality adjacent the center one of the three apertures and on the opposite side thereof from its associated slot;

(c) means for applying the other of said two forces to the outside of the piece at the ends thereof and at localities adjacent the slots associated with the two end apertures; and (d) strain sensitive resistance elements attached to the piece intermediate the ends of the legs.

10. Force measuring apparatus, comprising:

(a) two elongated, generally parallel stiffly flexible members;

(b) bridging means connecting one end of one member to the adjacent end of the other member;

(c) two foot means, respectively connected to the other ends of the two members, each said foot means extending from the connected member toward the other member, the extending portions of said foot means overlapping and being normally spaced apart in the direction of the length of said members;

(d) means including a resilient member for applying an unknown force to be measured to the extending portion of one of the foot means;

(e) means for applying a reactive force to the extending portion of the other foot means;

(f) said two force applying means acting in opposite directions and tending to move said extending portions together;

(g) first strain sensitive electrical resistance means mounted on at least one of said elongated members and adapted for connection in an electrical network, said first means being effective to measure said unknown force when it is within a first range where it is ineffective to move said extending portions together;

(h) second strain sensitive electrical resistance means mounted on said resilient member and adapted for connection in another electrical network, said second means being effective to measure said unknown force when it is within a second range greater than and including said first range.

11. Force measuring apparatus, comprising:

(a) a body having a central portion and a flange at one end of the central portion;

(b) said central portion of the body having a cylindrical aperture extending therethrough with its axis parallel to the plane of the flange;

(c) said body having an annular slot extending inwardly from the flanged end, said slot being eccentric with respect to the flange and a portion of the slot intersecting said aperture;

(d) said aperture and said slot cooperating to divide said body into two longitudinal leg portions connected by a bridging portion at their ends opposite the flange, one of said leg portions being connected to the flange, and the other being separated from the flange by said slot portion;
(e) means for applying a force to be measured to one of said leg portions opposite their connected ends;
(f) means for applying a reactive force to the other of said leg portions opposite their connected ends; and
(g) strain sensitive electrical resistance elements mounted on said leg portions and adapted for connection in an electrical network so that the resistance variations in the elements produce cumulative effects on an electrical output condition of the network.

12. Force measuring apparatus, comprising:
(a) a housing open at opposite ends;
(b) two flexible diaphragms having their peripheries attached to the housing and extending across the interior of the housing, said diaphragms cooperating with the portion of the housing between them to define a chamber;
(c) a body in said chamber having an elongated central portion substantially smaller than the internal dimensions of the chamber and a flange at one end of the central portion extending therefrom to the housing;
(d) means attaching the flange to the housing;
(e) said central portion of the body having a cylindrical aperture extending therethrough with its axis transverse to the housing;
(f) said body having an annular slot extending inwardly from the flanged end, said slot being eccentric with respect to the flange and intersecting said aperture;
(g) said aperture and said slot cooperating to divide said body into two longitudinal leg portions connected by a bridging portion at their ends opposite the flange, one of said leg portions being connected to the flange, and the other being separated from the flange by said slot;
(h) means connecting said other leg portion to both of said diaphragms for the transmission of forces thereto, so that the difference between ambient pressure and the pressure in the chamber acts in opposing directions on said other leg portion;
(i) means for applying a force to be measured to the central portion of one of said diaphragms;
(j) means for applying a reactive force to said housing; and
(k) strain sensitive electrical resistance elements mounted on said leg portions and adapted for connection in an electrical network so that the resistance variations in the elements produce cumulative effects on an electrical output condition of the network.

13. Force measuring apparatus, comprising:
(a) a housing open at least at one end;
(b) a flexible diaphragm having its periphery attached to the housing and extending across the open end of the housing, said diaphragm cooperating with the housing to define a chamber;
(c) a body in said chamber having an elongated central portion substantially smaller than the internal dimensions of the chamber and a flange at one end of the central portion extending therefrom to the housing;
(d) means attaching the flange to the housing;
(e) said central portion of the body having a cylindrical aperture extending therethrough with its axis transverse to the housing;
(f) said body having an annular slot extending inwardly from the flanged end, said slot being eccentric with respect to the flange, and with a portion of the slot intersecting said aperture;
(g) said aperture and said slot cooperating to divide said body into two longitudinal leg portions connected by a bridging portion at their ends opposite the flange, one of said leg portions being connected to the flange, and the other being separated from the flange by said slot portion;
(h) means connecting said other leg portion to said diaphragm for the transmission of forces thereto, so that the difference between externally applied pressure and the pressure in the chamber acts on said other leg portion;
(i) means for applying a reactive force to said housing; and
(j) strain sensitive electrical resistance elements mounted on said leg portions and adapted for connection in an electrical network so that the resistance variations in the elements produce cumulative effects on the electrical output condition of the network.

14. Force measuring apparatus, comprising:
(a) flexure means for converting opposed linear forces into bending moments, said flexure means including an integral piece of material having:
  (1) three parallel cylindrical apertures extending therethrough;
  (2) three slots, each extending the entire axial length of one of the three cylindrical apertures and each extending outwardly from its associated aperture to the periphery of the piece, said slots being parallel and the slot associated with the center one of the three apertures extending from its aperture in the opposite direction to the slots associated with the end apertures, so that the piece has two inner legs and two outer legs defining the apertures;
  (3) said legs extending generally parallel to the line of action of said opposed forces, said inner legs having equal cross-sectional dimensions and having their neutral axes spaced equal distances from said line, and outer legs having equal cross-sectional dimensions and having their neutral axes spaced equal distances from said line;
  (4) means for transmitting one of said forces to the adjacent ends of said two inner legs and the other of said forces to the corresponding ends of the outer legs, said transmitting means being effective to apply equal bending moments to said members;
  (5) said legs having respective surfaces equally spaced from said line and extending generally parallel thereto, the material of said members adjacent two of said surfaces being stressed in opposite senses by said bending moments;
(b) strain sensitive means including two strain sensitive electrical resistance elements, one mounted on each of said two surfaces; and
(c) bridge circuit means, including means connecting said two elements in adjacent arms of the bridge.

References Cited by the Examiner
UNITED STATES PATENTS

| | | | |
|---|---|---|---|
| 2,453,551 | 11/1948 | Statham | 73—88.5 X |
| 2,522,117 | 9/1950 | Holt et al. | 73—88.5 X |
| 2,814,946 | 12/1957 | Harris | 73—141 |
| 2,891,399 | 6/1959 | Rufolo | 73—141 X |
| 3,057,202 | 10/1962 | Dumas | 73—398 |
| 3,084,542 | 4/1963 | Statham | 73—141 |

FOREIGN PATENTS 1,030,597  3/1953  France.

RICHARD C. QUEISSER, Primary Examiner.
C. A. RUEHL, Assistant Examiner.